United States Patent [19]

Freeman

[11] Patent Number: 5,410,792

[45] Date of Patent: May 2, 1995

[54] CASTER WHEEL AXLE EXTRACTION APPARATUS

[76] Inventor: Gregory L. Freeman, 201 S. Fulton St., Salisbury, N.C. 28144

[21] Appl. No.: 204,634

[22] Filed: Mar. 2, 1994

[51] Int. Cl.6 ............................................. B23P 19/04
[52] U.S. Cl. ............................................ 29/252; 29/251
[58] Field of Search .................. 29/251, 426.5, 252, 29/263, 266, 281.1, 281.5; 59/7, 11

[56] References Cited

U.S. PATENT DOCUMENTS

| | | |
|---|---|---|
| 2,184,356 | 12/1939 | Lindgren . |
| 3,031,741 | 5/1962 | Bernardi, Sr. . |
| 3,359,618 | 12/1967 | Murphy ............................. 29/251 |
| 3,638,294 | 2/1972 | Durant . |
| 3,711,925 | 1/1973 | Mazer .............................. 29/252 |
| 4,305,195 | 12/1981 | Gould . |

*Primary Examiner*—Robert C. Watson
*Attorney, Agent, or Firm*—John R. Flanagan

[57] ABSTRACT

An axle extraction apparatus includes a housing defining a compartment for receiving and containing a workpiece, such as a bearing, from which a component such as an axle, is to be extracted, a hydraulic actuator having a cylinder attached to one end of the housing and a piston rod extending from the cylinder and aligned with the axle for engaging and forcably extracting the axle from the bearing upon actuation of the actuator, and a back-up locking crank rotatably threadably attached to the housing and operable for engaging and clamping the bearing in the compartment. The crank has a handle for gripping to rotate the crank and a spindle threaded into the housing and a central bore through the spindle through which the axle can move relative to the bushing as it is being extracted therefrom.

15 Claims, 2 Drawing Sheets

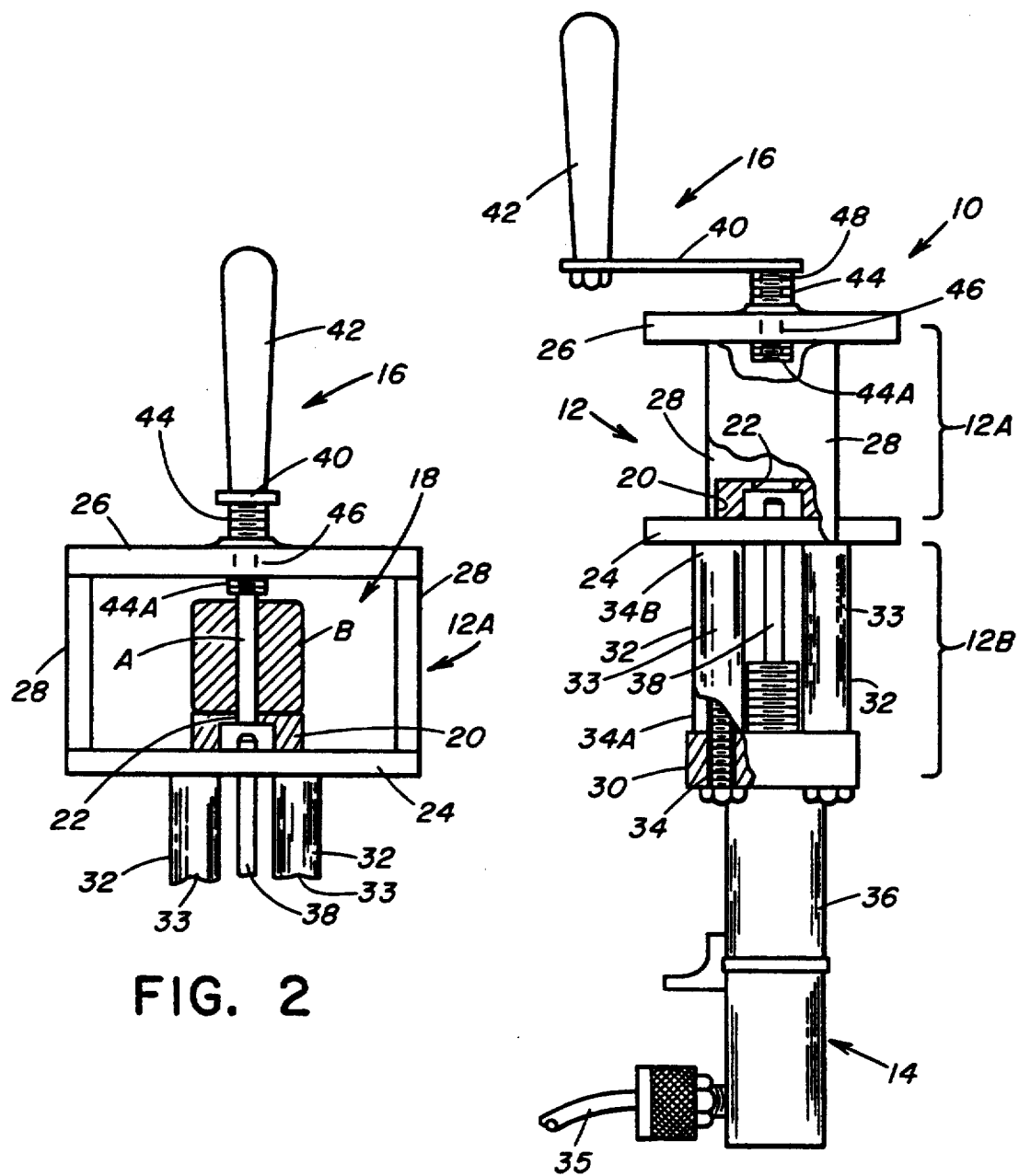

CASTER WHEEL AXLE EXTRACTION APPARATUS

BACKGROUND OF THE INVENTION

1. Field of the Invention

The present invention generally relates to an apparatus for disassembling an axle from a wheel and, more particularly, is concerned with an apparatus for extracting an axle being press-fitted within a bearing of a caster used on a shopping cart.

2. Description of the Prior Art

Retail stores typically provide shopping carts for customers to push about the store in order to carry the items they collect and intend to purchase later at checkout stations of the store at the conclusion of the shopping trip. Shopping carts experience considerable abuse from impacts with each other as well as with store and parking lot fixtures. Such abuse frequently leads to damage to components of the carts, such as the casters used on most shopping carts, which require servicing and oftentimes replacement of the casters.

Servicing of a caster frequently requires removal of the caster by removable of an axle from a bearing in the caster. The axle is tightly press-fitted into the bearing. It takes more then the use of pliers or the like and the manual strength of a service person to remove it. Some device or fixture which is capable of application of a considerable amount of force, substantially more than can be applied manually, is required to successfully extract an axle from a caster.

A variety of different pullers and presses have been proposed in the prior patent art to disassemble components from one another. Representative of these devices are the ones disclosed in U.S. patents to Lindgren (U.S. Pat. No. 2,184,356), Bernardi (U.S. Pat. No. 3,031,741), Durant (U.S. Pat. No. 3,638, 294) and Gould (U.S. Pat. No. 4,305,195). The Gould apparatus is used for disassembling and assembling skate wheels.

However, none of these prior art devices appear to be suitable for extraction of axles from casters. Consequently, a need still exists for an apparatus capable of use in removing an axle from the caster of a shopping cart.

SUMMARY OF THE INVENTION

The present invention provides an extraction apparatus designed to satisfy the aforementioned needs by permitting the removal of an inner component from an exterior component surrounding the inner component and tightly fitted over the inner component. The extraction apparatus of the present invention is particularly suited for extracting an axle from a caster, such as used on a shopping cart. The extraction apparatus is a hand-held device powered by a dual action hydraulic cylinder which permits extraction of the axle from the caster in a quick, easy and safe manner.

Accordingly, the present invention is directed to an extraction apparatus for use in removing an inner component from an outer component of a workpiece which surrounds and tightly slidably fits over the inner component of the workpiece. The extraction apparatus comprises: (a) a housing defining a compartment having an annular seat at an inner end for receiving and seating the outer component of the workpiece in the compartment with the inner component thereof tightly slidably fitted through the outer component being aligned along a longitudinal axis of the housing and with an aperture defined through the annular seat; (b) an actuator having an elongated cylinder supported adjacent to the housing and an elongated piston rod extending from the cylinder along the longitudinal axis such that, upon selective actuation of the actuator, the piston rod is extendable along the longitudinal axis through the aperture in the seat and into contact with the inner component fitted through the outer component seated in the compartment of the housing; and (c) means for engaging the outer component about the inner component and clamping the outer component against the seat on the inner end of the compartment, the engaging and clamping means having a central bore aligned with the aperture through the seat so as to permit passage therethrough of the inner component in response to axial movement thereof relative to and extraction thereof from the outer component upon the selected actuation of the actuator to cause extension of the piston rod toward and into forceable engagement with the inner component.

These and other features and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the following detailed description, reference will be made to the attached drawings in which:

FIG. 1 is a side elevational view of an extraction apparatus of the present invention.

FIG. 2 is a fragmentary side elevational view of the extraction apparatus after rotation ninety-degrees from the position in FIG. 1.

DETAILED DESCRIPTION OF THE INVENTION

Figure 3:
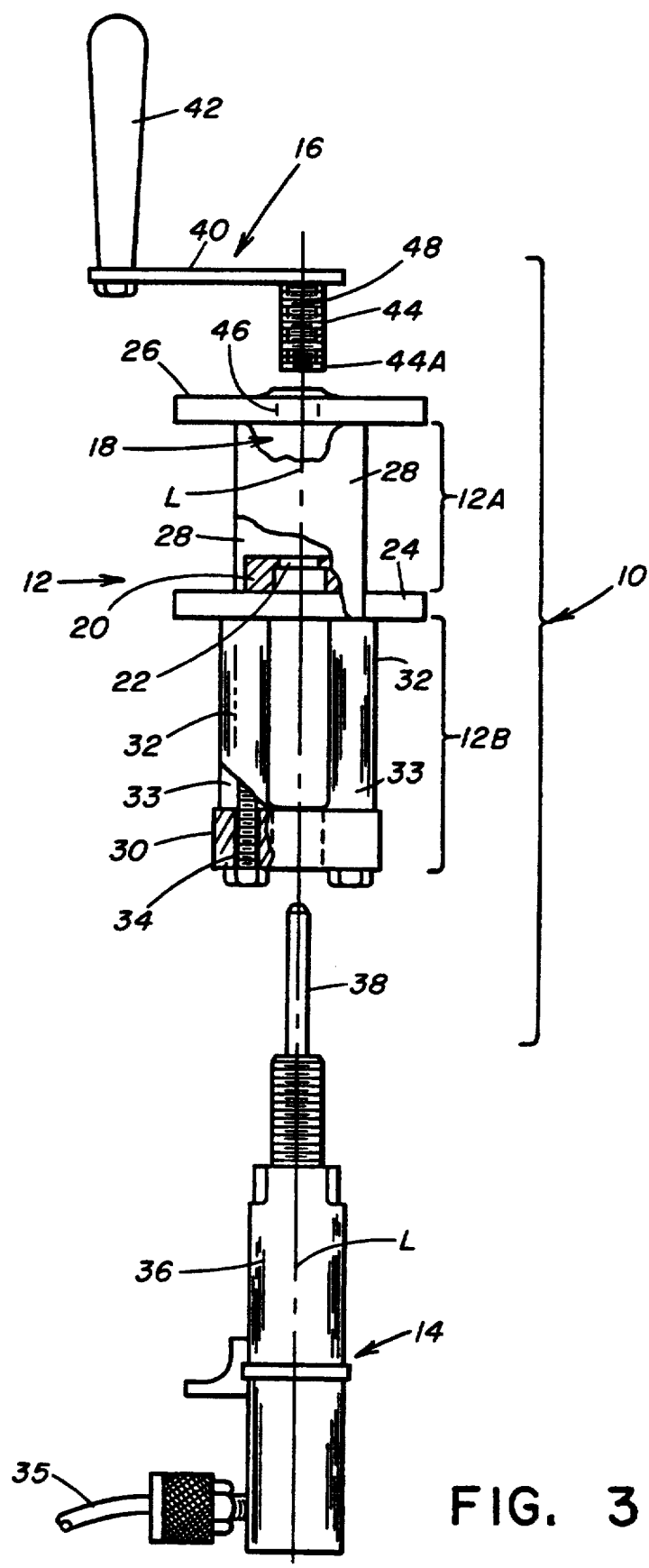
FIG. 3 is an exploded side elevational view of the extraction apparatus.

Referring to FIGS. 1-3 of the drawings, there is illustrated an extraction apparatus of the present invention, generally designated 10, for extracting an inner component from an outer component of a workpiece which surrounds the inner component of the workpiece and within which the inner component is tightly slidably fitted. By way of example herein, the workpiece is a shopping cart caster, the inner component is a central axle A of the caster, and the outer component is an annular bearing B of the caster.

Basically, the extraction apparatus 10 includes a housing 12, an actuator 14 and a back-up locking member 16. The housing 12 of the extraction apparatus 10 defines a compartment 18 having an annular seat 20 at an inner end 18A. The compartment 18 receives and seats the bearing B therein on the annular seat 20 with the axle A, which is tightly slidably fitted through the bearing B, being aligned along a longitudinal axis L of the housing 12 and also with an aperture 22 defined through the annular seat 20 in the housing 12.

More particularly, the housing 12 has a first end portion 12A and a second end portion 12B disposed adjacent to and connected in tandem relationship with the first end portion 12A. The first end portion 12A defines the compartment 18 with the annular seat 20 at the inner end of the first end portion 12A. The first end portion 12A of the housing 12 includes a pair of inner and outer end plates 24, 26 and a pair of side plates 28 extending between and attached at opposite ends to the inner and outer end plates 24, 26. The annular seat 20 is formed on and protrudes outwardly from the inner end plate 24 and the aperture 22 which extends through the seat 20 also extends through the inner end plate 24.

The second end portion 12B of the housing 12 includes a mounting sleeve 30 and a plurality of tubular support members 32. The tubular support members 32 are spaced circumferentially about and disposed radially outwardly from the longitudinal axis L of the housing 12. The support members 32 include rigid tubes 33 and elongated bolts 34 extending therethrough and attached at first ends 34A thereof in a spaced circumferential relationship about the sleeve 30 and attached at opposite second ends 34B thereof to the inner end plate 24 of the first end portion 12A of the housing 12.

The actuator 14 of the extraction apparatus 10, which is preferably is hydraulically powered through connection with a hydraulic fluid line 35, has an elongated cylinder 36 supported adjacent to the housing 12 and an elongated piston rod 38 extending from one end 36A of the cylinder 36 along the longitudinal axis A of the housing 12. The cylinder 36 at the one end 36A is coupled to the mounting sleeve 30. The sleeve 30 is internally threaded for threadable connection to the complementarily externally threaded end 36A of the cylinder 36.

Upon correspondingly selected actuation of the actuator 14, the piston rod 38 is respectively extendable and retractable along the longitudinal axis L of the housing 12. More particularly, upon extension of the piston rod 38 it will move through the aperture 22 in the inner end plate 24 and annular seat 20 and into contact with an inner end of the axle A fitted through the bearing B which is seated on the seat 20 in the compartment 18 of the housing 12.

The locking member 16 of the extraction apparatus 10 is a hand crank 16 for engaging the outer end of the bearing B about the axle A and clamping or locking the bearing B against the annular seat 20 on the inner end plate 24 of the first end portion 12A of the housing 12. The locking crank 16 includes a crank arm 40, a handle 42 attached at one end to an outer end of the crank arm 40, and a spindle 44 mounting the crank arm 40 so as to extend radially outwardly therefrom for gripping by the handle 42 to rotate the spindle 44. The spindle 44 is rotatably threadably inserted through a threaded hole 46 defined through the outer end plate 26 of the housing 12 and aligned with the aperture 22 through the annular seat 20 one the inner end plate 24 of the housing 12. The spindle 44 has an inner end 44A engageable with the outer end of the bearing B about the axle A so as to clamp the bearing B against the annular seat 20. The spindle 44 also has a central bore 48 aligned with the aperture 22 through the annular seat 20 so as to permit passage therethrough of the axle A in response to axial movement relative to and extraction thereof from the bearing B upon selective actuation of the actuator 14 to cause extension of the piston rod 38 thereof toward and into forceable engagement with the axle A.

It is thought that the present invention and many of its advantages will be understood from the foregoing description and it will be apparent that various changes may be made thereto without departing from the spirit and scope of the invention or sacrificing all of its material advantages, the form hereinbefore described being merely preferred or exemplary embodiment thereof.

I claim:

1. An extraction apparatus for use in removing an inner component from an outer component within which the inner component is tightly fitted, said extraction apparatus comprising:
   (a) a housing defining a compartment having an annular seat at an inner end for receiving and seating an outer component in said compartment with an inner component tightly slidably fitted through the outer component being aligned along a longitudinal axis of the housing and with an aperture defined through said annular seat;
   (b) an actuator having an elongated cylinder supported adjacent to said housing and an elongated piston rod extending from said cylinder along said longitudinal axis such that, upon selective actuation of said actuator, said piston rod is extendable along said longitudinal axis through said aperture in said seat and into contact with the inner component fitted through the outer component seated in said compartment of said housing; and
   (c) means for engaging the outer component about the inner component and clamping the outer component against said seat on said inner end of said compartment, said engaging and clamping means having a central bore aligned with said aperture through said seat so as to permit passage therethrough of the inner component in response to axial movement thereof relative to and extraction thereof from the outer component upon said selected actuation of said actuator to cause extension of the piston rod toward and into forceable engagement with the inner component.

2. The apparatus of claim 1 wherein said housing has a first end portion and a second end portion disposed adjacent to and connected in tandem relationship with said first end portion, said first end portion defining said compartment with said annular seat at an inner end of said first end portion.

3. The apparatus of claim 1 wherein said first end portion of said housing includes a pair of inner and outer end plates and a pair of side plates extending between and attached at opposite ends to said inner and outer end plates.

4. The apparatus of claim 3 wherein said annular seat is formed on said inner end plate and said aperture through said seat also extends through said inner end plate.

5. The apparatus of claim 3 wherein said second end portion includes a mounting sleeve and a plurality of tubular support members being attached at first ends thereof in a spaced circumferential relationship about said sleeve and at opposite second ends thereof to said inner end plate of said first end portion of said housing.

6. The apparatus of claim 1 wherein said second end portion includes a mounting sleeve and a plurality of tubular support members being attached at first ends thereof in a spaced circumferential relationship about said sleeve and at opposite second ends thereof to said first end portion of said housing.

7. The apparatus of claim 6 wherein said tubular support members are spaced circumferentially about and disposed radially outwardly from said longitudinal axis of said housing.

8. The apparatus of claim 7 wherein said mounting sleeve is coupled to an end of said cylinder of said actuator.

9. The apparatus of claim 8 wherein said sleeve and cylinder end are complementarily threaded for threadable connected with one another.

10. The apparatus of claim 3 wherein said engaging and clamping means includes a crank arm, a handle attached to an outer end of said crank arm, and a spindle mounting said crank arm so as to extend radially outwardly therefrom for gripping to rotate said spindle, said spindle being rotatably threadably insertable through a threaded hole defined through said outer end plate of said first end portion of said housing spaced opposite of said inner end plate thereof and aligned with said aperture through said seat and said inner end plate.

11. The apparatus of claim 10 wherein said spindle has an inner end engageable with the outer component about the inner component so as to clamp the outer component against said seat on said inner end plate of said first end portion of said housing, said spindle having a central bore aligned with said aperture through said seat so as to permit passage therethrough of the inner component in response to axial movement relative to and extraction thereof from the outer component upon actuation of said actuator to cause extension of said piston rod toward and into forceable engagement with the inner component.

12. An extraction apparatus for use in removing an inner component from an outer component within which the inner component is tightly fitted, said extraction apparatus comprising:
  (a) a housing having a first end portion and a second end portion in tandem relationship with said first end portion, said first end portion defining a compartment having an annular seat at inner end of said first end portion for receiving an outer component in said compartment and disposed on said seat with an inner component, being tightly slidably fitted through the outer component, aligned along a longitudinal axis of the housing and with an aperture defined through said annular seat;
  (b) an actuator having an elongated cylinder supported at an end of said second end portion of said housing and an elongated piston rod extending from an end of said cylinder through said second end portion of said housing toward said first end portion thereof and upon selective actuation of said actuator being retractable and extendable into and from said cylinder along said longitudinal axis of said housing, said piston rod being aligned along said longitudinal axis of said housing with said aperture in said seat and the inner component fitted through the outer component received in said compartment of said first end portion of said housing; and
  (c) a locking member having a handle arm and a spindle mounting said handle arm so as to extend radially outwardly therefrom for gripping to rotate said spindle, said spindle being rotatably threadably insertable through a threaded hole defined through an outer end of said first end portion of said housing spaced opposite of said inner end thereof and aligned with said aperture through said seat thereon, said spindle having an inner end engageable with the outer component about the inner component so as to clamp the outer component against said seat on said inner end of said first end portion, said spindle having a central bore aligned with said aperture through said seat so as to permit passage therethrough of the inner component in response to axial movement relative to and extraction thereof from the outer component upon actuation of said actuator to cause extension of the piston rod toward and into forceable engagement with the inner component.

13. The apparatus of claim 12 wherein said first end portion of said housing includes a pair of inner and outer end plates and a pair of side plates extending between and attached at opposite ends to said inner and outer end plates.

14. The apparatus of claim 13 wherein said annular seat is formed on said inner end plate and said aperture through said seat also extends through said inner end plate.

15. The apparatus of claim 13 wherein said second end portion includes a mounting sleeve and a plurality of tubular support members being attached at first ends thereof in a spaced circumferential relationship about said sleeve and at opposite second ends thereof to said inner end plate of said first end portion of said housing.

* * * * *